United States Patent Office 3,644,329
Patented Feb. 22, 1972

3,644,329
WATER-INSOLUBLE MONO-AZO DYESTUFFS CONTAINING A CINNAMOYLAMINE COUPLING COMPONENT
Jean Marie Louis Le Roy, Saint-Etienne-du-Rouvray, and Claude Marie Henri Emile Brouard, Sotteville-les-Rouen, France, assignors to Ugine Kuhlmann, Paris, France
No Drawing. Filed Mar. 11, 1969, Ser. No. 806,319
Claims priority, application France, Mar. 21, 1968, 144,667
Int. Cl. C09d 29/00
U.S. Cl. 260—207.1       5 Claims

ABSTRACT OF THE DISCLOSURE

Dyestuffs, containing no acid groups, of the formula:

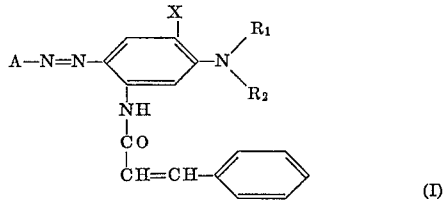

(I)

in which A represents the residue of a diazotisable amine, $R_1$ and $R_2$ each represent an alkyl group having up to four carbon atoms and X represents a hydrogen atom or a methyl, ethyl, methoxy or ethoxy group.

Coupling compounds of the formula:

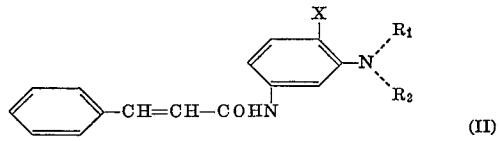

(II)

in which $R_1$, $R_2$ and X have the meanings given above.

The dyestuffs are of particular interest for the colouration of hydrophobic fibres and processes for the preparation of the dyestuffs and the coupling compounds are disclosed.

---

The present invention relates to new mono- and disazo dyestuffs which are of particular interest for the colouration of hydrophobic fibres.

These new dyestuffs, containing no acid groups, may be presented by the general formula:

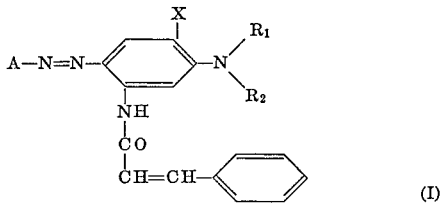

(I)

in which R represents the residue of a diazotisable amine, $R_1$ and $R_2$ each represent an alkyl group having up to four carbon atoms and X represents a hydrogen atom or a methyl, ethyl, methoxy or ethoxy group.

The dyestuffs of Formula I may be prepared for example by coupling in acid medium the diazo derivative of an aromatic or heterocyclic diazotisable amine A—$NH_2$ with a coupling compound of the general formula:

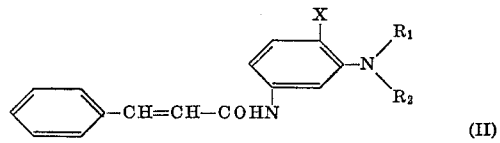

(II)

in which A, $R_1$, $R_2$ and X have the same significance as above.

The diazotisable amine $ANH_2$ may belong to a variety of series, such as for example the following: benzene, benzene-azo-benzene, naphthalene, naphthalene-azo-benzene, thiazole, benzothiazole, thiadiazole, or thiophene. In the case of heterocyclic amines, the amino function may be either on the heterocyclic ring or on the benzene ring. The diazotisation of the amine may be effected for example by known processes using sodium nitrate or acid nitrosyl sulphate.

The coupling compounds of Formula II are new products. They may be prepared, for example by the action of cinnamoyl chloride in an inert solvent or diluent on an amine of the general formula:

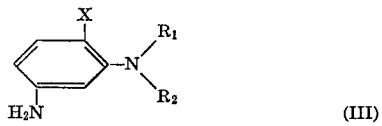

(III)

wherein X, $R_1$ and $R_2$ have the meanings given above in the presence of an acid-absorbing agent. Those coupling compounds in which $R_1$ and $R_2$ are identical may also be obtained for example by subjecting compounds of the formula:

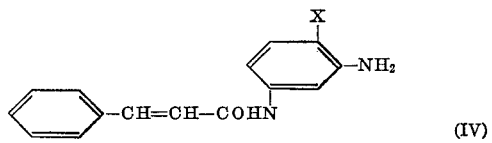

(IV)

to an alkylation treatment.

In view of their tinctorial applications, it is advantageous for the dyestuffs obtained to be in a finely divided state. For this reason, the dyestuffs according to the invention are preferably pre-dispersed and provided in the form of a paste or powder. This form may be obtained by mixing the dyestuffs in paste form with dispersing agents, and possibly with inert diluents. If desired the mixing may be followed by drying and grinding. The dyestuffs thus treated can then be used for dyeing in a long or short bath, in foularding or in printing.

Examples of dispersing agents which may be used are the products resulting from the condensation of naphthalenesulphonic acids with formaldehyde, especially the dinaphthylmethane disulphonates, esters of sulphonated succinic acid, alkali metal salts of sulphuric esters of fatty alcohols, for example sodium lauryl-sulphate, lignosulphonates, soap, alkali metal salts of the sulphuric esters of monoglycerides of fatty acids or the products obtained by the condensation of the cresols with formaldehyde and naphthol-sulphonic acids, condensation products of 4,4'-dihydroxy-diphenylsulphone with formaldehyde and alkali metal bisulphites.

The dyeing of polyester fibres may be carried out in the presence of a carrier at a temperature from 80° C. to 125° C. inclusive or without a carrier under pressure at a temperature from 100° C. and 140° C. inclusive.

The fibres can also be foularded or printed with aqueous dispersions of the new dyestuffs, the impregnation obtained being then fixed at a temperature from between 140° C. to 230° C. inclusive for example by means of steam, air or by contact with a heated surface. The range of temperature from 180° C to 200° C. inclusive is particularly favourable, since the dyestuffs diffuse rapidly into the polyester fibres and do not sublime even if the action of these high temperatures is prolonged. This enables fouling of the dyeing apparatus to be avoided.

Cellulose diacetate is preferably dyed by exhaustion at a temperature from 65° C. to 85° C. inclusive and cellulose triacetate and polyamide fibres are preferably dyed at a temperature up to 115° C. The most favourable pH region is between 2 and 9 inclusive and especially between 4 and 8 inclusive. Like the polyester fibres, the triacetate and polyamide fibres can be foularded or printed with an aqueous suspension of the new dyestuffs with subsequent fixing of the impregnation obtained at a temperature from 140° C. to 210° C. inclusive.

During foularding or printing, the usual thickeners may be used, for example modified or unmodified natural products, such as alginates, crystalline gum, carob, gum tragacanth, carboxymethyl-cellulose, hydroxyethylcellulose, starch, or synthetic products such as polyacrylic amides or polyvinyl alcohols.

The shades thus obtained are remarkably fast to thermal fixation, sublimation, creasing, combustion gases, overdyeing, dry cleaning, chlorine and wet tests, for example water, washing and sweat. The reserve of the natural fibres, especially of wool and cotton, and the dischargeability are good. The fastness to light is remarkable even with light shades, so that the new dyestuffs are very suitable for the production of fashion shades. The dyestuffs resist boiling and reduction at temperatures from 80° C. to 220° C. inclusive. This stability is not altered by the bath ratio nor by the presence of dyeing accelerators.

The new dyestuffs can also be used for dyeing polyolefine fibres, and fibres based on polymers or copolymers of acrylonitrile or based on polyvinyl derivatives.

The dyestuffs of Formula I can further be used for the bulk colouration of varnishes, oils, synthetic resins and synthetic fibres spun from their solutions in organic solvents.

Compared with similar dyestuffs of the formula:

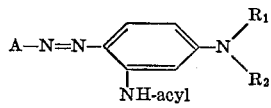

such as N-formylated and N-acetylated derivatives, the dyestuffs according to the invention has a distinctly improved fastness to sublimation.

The invention is illustrated by, but not limited to, the following examples, in which the parts are parts by weight unless the contrary is indicated.

EXAMPLE 1

408 parts of freshly distilled (B.P. 112° C. under 0.7 mm.) N,N-dimethyl-metaphenylenediamine are added to 900 parts of xylene then 450 parts of freshly distilled N,N-diethyl-aniline, and finally, in small portions, 500 parts of cinnamoyl chloride are added. The temperature rises spontaneously to 115° C. The reaction product is kept for 2 hours under gentle reflux, then left to cool. The thick mass is run into 4500 parts of water at 60° C. with vigorous strring, and the mixture is filtered, and the solid again made into a paste in 2000 parts of hot water, the paste is acidified until a violet colouration is obtained on Congo red paper, then filtered, and the solid dried. 785 parts of N,N - dimethyl-N'-cinnamoyl-metaphenylene-diamine are obtained. Melting point: 182–183° C.

EXAMPLE 2

20.8 parts of 2-amino-3,5-dinitro-benzonitrile are made into a paste in 50 parts of 66° Bé. sulphuric acid. The mixture is cooled to 0° C. and 100 parts of acid nitrosyl sulphate (prepared from 6.9 parts of sodium nitrite) are run in, while the temperature is maintained at between 0° C. and 5° C. After stirring for some hours, 50 parts of acetic acid and then 26 parts of N,N-dimethyl-N'-cinnamoylmetaphenylenediamine dissolved in 100 parts of acetic acid are added, while maintaining the same temperature. The syrupy mass is run into a mixture of water and ice, filtered, and if desired again made into a paste and a dispersing agent added to the paste, for example a cresol-formaldehyde-naphtholsulphonic acid condensation product, and ground. The dyestuffs dyes fibres of ethyleneglycol polyterephthalate and cellulose triacetate a greenish blue shade.

The following table gives additional examples of dyestuffs according to the invention. The bases used for their preparation can be diazotised by the conventional industrial methods, for example by means of sodium nitrite or acid nitrosyl sulphate according to their basicity. The cinnamoylamino group of formula

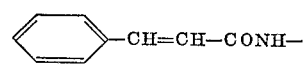

is denoted by the abbreviation Nz. The shades are those obtained on ethylene glycol polyterephthalate fibres.

TABLE I

| Example | Dyestuff | Shade |
|---|---|---|
| 3 | [4-nitro-2-cyano-6-chloro-benzene]-(1 azo 1)-[4-dimethyl-amino-2-Nz-benzene]. | Blue. |
| 4 | [2,4-dinitro-benzene]-(1 azo 1)-[4-diethylamino-2-Nz-benzene]. | Red violet. |
| 5 | [4-nitro-2-cyano-benzene]-(1 azo 1)-[N-ethyl-4-N-methyl-amino-2-Nz-benzene]. | Do. |
| 6 | [2,4-dinitro-6-chloro-benzene]-(1 azo 1)-[4-dimethylamino-2-Nz-benzene]. | Blue violet. |
| 7 | [4-nitro-2-methylsulphonyl-benzene]-(1 azo 1)-[4-dimethylamino-2-Nz-benzene]. | Red violet. |
| 8 | [4-nitro-2,6-dichloro-benzene]-(1 azo 1)-[4-dimethylamino-2-Nz-benzene]. | Bordeaux. |
| 9 | [2,4-dinitro-6-methylsulphonyl-benzene]-(1 azo 1)-[4-dimethyl-amino-2-Nz-benzene]. | Greenish blue. |
| 10 | [4-nitro-2-methoxycarbonyl-benzene]-(1 azo 1)-[4-dimethyl-amino-2-Nz-benzene]. | Bluish red. |
| 11 | [4-cyano-benzene]-(1 azo 1)-[4-dipropylamino-2-Nz-benzene]. | Scarlet. |
| 12 | [2-cyano-benzene]-(1 azo 1)-[4-diethylamino-2-Nz-benzene] | Orange red. |
| 13 | [4-chloromethylsulphonyl-benzene]-(1 azo 1)-[4-dimethyl-amino-2-Nz-benzene]. | Scarlet. |
| 14 | [2,4-dinitro-6-chloro-benzene]-(1 azo 1)-[5-methoxy-4-dimethyl-amino-2-Nz-benzene]. | Blue. |
| 15 | [2-cyano-4-nitro-benzene]-(1 azo 1)-[5-methyl-4-dimethyl-amino-2-Nz-benzene]. | Blue violet. |
| 16 | [2-nitro-4-methylsulphonyl-benzene]-(1 azo 1)-[4-dimethyl-amino-2-Nz-benzene]. | Bluish red. |
| 17 | [2-chloro-4-nitro-benzene]-(1 azo 1)-[4-dimethylamino-2-Nz-benzene]. | Do. |
| 18 | [4-nitro-benzene]-(1 azo 1) -[5-methyl-4-dimethylamino-2-Nz-benzene]. | Scarlet. |

TABLE I—Continued

| Example | Dyestuff | Shade |
|---|---|---|
| 19 | [4-thiocyanato-benzene]-(1 azo 1)-[4-dimethylamino-2-Nz-benzene]. | Red orange. |
| 20 | [4-ethoxycarbonyl-benzene]-(1 azo 1)-[4-dimethylamino-2-Nz-benzene]. | Orange. |
| 21 | [4-acetyl-benzene]-(1 azo 1)-[4-dimethylamino-2-Nz-benzene]. | Do. |
| 22 | [4-dimethylaminosulphonyl-benzene]-(1 azo 1)-[4-dimethylamino-2-Nz-benzene]. | Do. |
| 23 | [4-cyclohexylaminocarbonyl-benzene]-(1 azo 1)-[4-dimethylamino-2-Nz-benzene]. | Do. |
| 24 | [2-nitro-4-chloro-benzene]-(1 azo 1)-[4-dimethylamino-2-Nz-benzene]. | Red. |
| 25 | [2-nitro-4-trifluoromethyl-benzene]-(1 azo 1)-[4-dimethylamino-2-Nz-benzene]. | Do. |
| 26 | [2,4-dinitro-6-bromo-benzene]-(1 azo 1)-[5-ethoxy-4-dimethylamino-2-Nz-benzene]. | Blue. |
| 27 | [2-cyano-4-chloro-benzene]-(1 azo 1)-4-dimethylamino-2-Nz-benzene]. | Scarlet. |
| 28 | [2-chloro-4-nitro-benzene]-(1 azo 1)-[4-dibutylamino-2-Nz-benzene]. | Red violet. |

By coupling the diazo derivatives of the amines listed below with $N_1,N_1$-dimethyl-$N_3$-cinnamoyl-1,3-phenylenediamine, other dyestuffs of Formula I are obtained.

TABLE II

| Example | Amines | Shade on polyester |
|---|---|---|
| 29 | 4-methylsulphonyl-1-naphthylamine | Red brown. |
| 30 | 2-amino-5-nitro-thiazole | Reddish blue. |
| 31 | 5-nitro-2-amino-1,3,4-thiadiazole | Ruby. |
| 32 | 2-amino-3-nitro-5-acetyl-thiophene | Green blue. |
| 33 | 2-amino-6-nitro-benzothiazole | Ruby. |
| 34 | 2-amino-6-cyano-benzothiazole | Bluish red. |
| 35 | 2-amino-4,6-dinitro-benzothiazole | Green blue. |
| 36 | 2-amino-4-nitro-6-methylsulphonyl-benzothiazole. | Blue violet. |
| 37 | 2-amino-6-chloromethylsulphonyl-benzothiazole. | Ruby. |
| 38 | 2-amino-6-thiocyanato-benzothiazole | Do. |
| 39 | 3-phenyl-5-amino-1,2,4-thiadiazole | Do. |
| 40 | 4-amino-azobenzene | Red. |
| 41 | 4-amino-2-methoxy-azobenzene | Bluish red. |
| 42 | 4-amino-3-chloro-azobenzene | Do. |
| 43 | 4′-nitro-2-methyl-4-amino-azo-benzene | Red. |
| 44 | 1-phenylazo-4-amino-naphthalene | Red. |

EXAMPLE 45

A fabric of ethylene glycol polyterephthalate is impregnated by foularding with a bath which contains, per 1000 parts by volume, 9.0 parts of the dyestuff obtained in Example 2, 0.5 part of a polyglycol ether of oleyl alcohol, 1.5 parts of a polyacrylic amide and the amount of water necessary to make up to 1000 parts. After drying, the fabric is subjected to thermal fixation for 1 minute at 200° C. and then to a reducing treatment by sodium dithionite. A greenish blue shade is obtained which is fast to light and sublimation.

EXAMPLE 46

A fabric of ethyleneglycol polyterephthalate is printed with a printing paste which contains, per 1000 parts, 20 parts of the dyestuff described in Example 3, 150 parts of the sodium salt of a sulphonated castor oil, 600 parts of a thickener and 230 parts of water. After drying, the fabric is subjected to thermal fixation for 1 minute at 200° C. and then to a reducing treatment. A blue shade having good general fastness is obtained.

EXAMPLE 47

100 parts of a cellulose triacetate fabric are introduced at 60–70° C. into a dyebath of 3000 parts by volume, which contains 1 part of the dyestuff described in Example 18 and 15 parts of o-phenylphenol. The bath is brought to the boil in a period of half an hour and the dyeing is continued at the boil for 1 hour. After finishing treatment, a scarlet shade of good general fastness is obtained.

We claim:

1. A monoazo dyestuff of the formula:

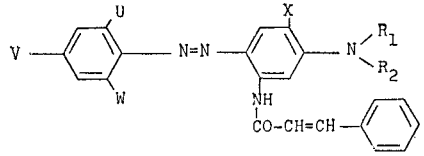

wherein $R_1$ and $R_2$ each represent an alkyl group having up to four carbon atoms, X is hydrogen, methyl, ethyl, methoxy or ethoxy, U is hydrogen, chlorine, cyano, nitro, methylsulfonyl or methoxycarbonyl, V is hydrogen, chlorine, cyano, nitro, methylsulfonyl, ethoxycarbonyl, acetyl, trifluoromethyl, thiocyanato, chloromethylsulfonyl, dimethylaminosulfonyl or cyclohexylaminocarbonyl and W is H, chlorine, bromine or nitro.

2. [2-cyano - 4,6 - dinitro - benzene]-(1 azo 1)-[2-cinnamoylamino-4-dimethylamino-benzene].

3. [4-nitro - 2 - cyano - 6 - chloro-benzene]-(1 azo 1)-[2-cinnamoylamino-4-dimethylamino-benzene].

4. [4 - nitro - 2 - cyano - benzene]-(1 azo 1)-[2-cinnamoylamino-4-N-ethyl-N-methylamino-benzene].

5. [2 - nitro - 4 - chloro - benzene]-(1 azo 1)-[2-cinnamoylamino-4-dimethylamino-benzene].

References Cited

FOREIGN PATENTS 993,162   5/1965   Great Britain _____ 260—207.1

LEWIS GOTTS, Primary Examiner

D. M. PAPUGA, Assistant Examiner

U.S. Cl. X.R.

260—152, 155, 187, 191, 196, 207, 558 R; 8—179